United States Patent [19]

Nishida et al.

[11] 4,182,745

[45] Jan. 8, 1980

[54] CATALYST FOR REDUCING NITROGEN OXIDES IN A WASTE GAS AND A PROCESS FOR CATALYTICALLY REDUCING NITROGEN OXIDES CONTAINED IN A WASTE GAS

[75] Inventors: Fusao Nishida, Tokyo; Toshihiro Ueno; Tomiaki Yamada, both of Yokohama; Noriyuki Suzuki, Tokyo; Takehiko Takeda, Yokohama; Tsutomu Yanagihara, Tokyo; Katsuhiko Adachi, Yokohama; Tadashi Asanabe, Zushi; Katsuaki Ohsato, Yokohama; Kintaro Tsuda, Tokyo; Keiichiro Watanabe, Yokohama, all of Japan

[73] Assignee: JGC Corporation, Tokyo, Japan

[21] Appl. No.: 842,668

[22] Filed: Oct. 17, 1977

Related U.S. Application Data

[63] Continuation of Ser. No. 602,192, Aug. 6, 1975, abandoned.

[30] Foreign Application Priority Data

Aug. 6, 1974 [JP] Japan .................................. 49/89470

[51] Int. Cl.$^2$ ............................................. B01D 53/00
[52] U.S. Cl. ................................ 423/239 A; 252/468; 252/469; 252/470
[58] Field of Search ................ 423/239; 252/468, 469, 252/470

[56] References Cited

U.S. PATENT DOCUMENTS

| | | | |
|---|---|---|---|
| 2,886,515 | 5/1959 | Turkevich | 252/420 |
| 3,279,884 | 10/1966 | Nonnenmacher et al. | 423/239 A |
| 3,513,109 | 5/1970 | Stiles | 423/213.2 |
| 3,752,776 | 8/1973 | Chester et al. | 252/465 |

FOREIGN PATENT DOCUMENTS

| | | | |
|---|---|---|---|
| 2434416 | 2/1975 | Fed. Rep. of Germany | 252/470 |
| 1504331 | 10/1967 | France | 423/239 |
| 50-35087 | 4/1975 | Japan | 423/239 |

*Primary Examiner*—G. O. Peters
*Attorney, Agent, or Firm*—Cooper, Dunham, Clark, Griffin & Moran

[57] ABSTRACT

The present invention relates to a catalyst comprising at least a metal salt of heteropoly-acid, which is composed of a sort of heteropoly-acid and one or more metals selected from a group of the first transition metals of the periodic table. The catalyst of the present invention exhibits high activity and selectivity in the catalytic reduction of nitrogen oxides with ammonia at a temperature of from 250° to 550° C. and offers high resistivity to the poisonous effect of sulfur oxides. It does not entail a wasteful use of the reducing agent, because the catalyst of the present invention does not accelerate the reaction of the reducing agent such as ammonia with oxygen coexisting in the waste gas to be treated, which results in the elimination of the undesired excessive consumption of the reducing agent.

Therefore, this invented catalyst may provide a commercially advantageous process for removing harmful constituents, nitrogen oxides from a waste gas which contains the same and additionally, in some cases, sulfur dioxides.

16 Claims, No Drawings

CATALYST FOR REDUCING NITROGEN OXIDES IN A WASTE GAS AND A PROCESS FOR CATALYTICALLY REDUCING NITROGEN OXIDES CONTAINED IN A WASTE GAS

This is a continuation of application Ser. No. 602,192 filed Aug. 6, 1975, now abandoned.

BACKGROUND OF THE INVENTION (a) Field of the Invention

The present invention relates to a catalyst for reducing nitrogen oxides (which means $N_2O$, $NO$ and $NO_2$ in general) in flue gas or industrial waste gas coming from facilities such as boilers, heating furnaces and incinerators and a process for reducing nitrogen oxides to nitrogen with a reducing agent such as ammonia in the presence of the catalyst.

(b) Description of the Prior Art

For the removal of nitrogen oxides present in a waste gas, there have been proposed various processes. These processes comprise the catalytic oxidation process, the catalytic decomposition process, the catalytic reduction process and the adsorption process. The catalytic reduction processes are classified into the selective reduction process and the non selective reduction process according to whether the reducing agent selectively reacts with nitrogen oxides in the waste gas or not.

In the selective reduction process, hydrogen sulfide, ammonia, etc. are ordinarily used as the reducing agent. A noble metal catalyst containing such as Pt metal and a metal oxide catalyst containing an oxide or oxides of metal such as copper and iron are well-known as the selective reducing catalysts of nitrogen oxides in the presence of ammonia. A complex catalyst comprising two or more metal oxides may be used.

In an industrial waste gas which contains nitrogen oxides usually together with 1,000 to 2,000 ppm of sulfur oxides (which means $SO_2$, $SO_3$, etc. in general), conventional catalysts, particularly noble metal catalyst is degraded in activity during the catalytic reducing reaction of nitrogen oxides, because of the poisonous effect of sulfur oxides, and hence the continuous operation for a long period of time is difficult to be performed. Thus, this process can not be commercially applied for reducing nitrogen oxides in the waste gas containing sulfur oxides. Therefore, in the operation of the catalytic $NO_x$-reducing process in the industrial scale, it will be necessary to remove sulfur oxides from the waste gas beforehand or to use catalysts having high resistivity to the poisonous effect of sulfur oxides.

SUMMARY OF THE INVENTION

One of the objects of the present invention is to provide the catalyst comprising at least a metal salt of heteropoly-acid which is composed of a sort of heteropoly-acid and one or more metals selected from a group of the first transition metals of the periodic table as an active component suitable to use in a process for reducing nitrogen oxides to nitrogen with ammonia as a reducing agent.

Another object of the present invention is to provide a process for catalitically reducing nitrogen oxides present in the waste gas to nitrogen with ammonia as the reducing agent in the presence of said catalyst at a temperature of 250° to 550° C.

Even if the waste gas to be treated contains sulfur oxides, continuous operation for a long period of time can be performed in the presence of the catalyst of the present invention.

DETAILED DESCRIPTION OF THE INVENTION

As a result of extended study of catalysts having high resistivity to the poisonous effect of sulfur oxides, we have found that the catalyst comprising at least a metal salt of heteropoly-acid as an active component exhibits high activity and high selectivity in the catalytic reduction of nitrogen oxides with ammonia as the reducing agent and that the catalyst of the present invention manifests a high initial activity even in the presence of sulfur oxides and retains this activity for a long period of the continuous operation.

Heteropoly-acid referred to hereinafter means polyacid which is formed by poly-condensation of inorganic acids and contains two or more metal elements. Said heteropoly-acid possesses a structure that polyacid radicals of a metal coordinates around a metal as a center atom.

It is known that polyacid radical constituting heteropoly-acid is oxyacid of metals such as vanadium, molybdenum, tungsten, etc. and a center atom of the heteropoly-acid is metal such as silica, stannum, titanium, zirconium, phosphorous, stibium, chromium and manganese.

Heteropoly-acid being used in the present invention is selected from heteropoly-acids such as silicatungstic acid, silicomolybdic acid, phosphotungstic acid, phosphomolybdic acid, etc. Metal suitable for forming a metal salt with heteropoly-acid is selected from a group of the first transition metals such as copper, titanium, vanadium, chromium, manganese, iron, cobalt, nickel, etc. Among them copper and iron are preferable to use.

Typical metal salts of heteropoly-acid used in the present invention are iron silicotungstate, copper silicotungstage, iron silicomolybdate, copper silicomolybdate, iron phosphotungstate, copper phosphotungstate, iron phosphomolybdate and copper phosphomolybdate. The catalyst of the present invention may contain one or more oxides of metals selected from a group of the first transition metals such as copper, iron, etc. together with the above mentioned metal salts of heteropoly-acids.

In the present invention, the metal salt of heteropoly-acid is supported on a heat-resistant porous material such as alumina, silica, silica-alumina and diatomaceous earth. The carrier in the present invention may preferably have not less than 50 $m^2/g$ of specific surface area, from 0.2 to 1.5 cc/g of pore volume. Especially preferable carrier is silica-alumina containing 60 to 90% by weight of silica.

The amount of the active component supported on the carrier is at least 0.5% by weight of the metal salt of heteropoly-acid based on the weight of the catalyst to obtain the desired catalytic activity. The activity of the catalyst is not increased even if more than 50% by weight of the metal salt of heteropoly-acid are supported on the carrier. The preferable amount of the metal salt of heteropoly-acid is 1 to 30% by weight based on the weight of catalyst.

For the preparation of the catalyst, there may be adopted any of the conventionally known ordinary methods. One of the methods suitable for the present invention is an impregnating method which comprises the steps of impregnating the carrier such as alumina, silica, and silica-alumina molded in the form of spheres or pellets with an aqueous soltuion containing the heteropoly-acid selected from the group of silicotungstic acid, silicomolybdic acid, phosphotungstic acid and phosphomolybdic acid and one or more salts of the first transition metals of the periodic table such as nitrate, carbonate, acetate, etc., drying the resultant impregnates at a temperature from 100° to 120° C., and subsequently calcining them at a temperature from 400° to 600° C. Another method for preparing the catalyst is a kneading method which comprises the steps of admixing the carrier powder with an aforesaid mixture, evaporating most of water contained in the carrier powder and subsequently kneading the resulted material, subjecting the same to extrusion or tablet-molding and thereafter calcining the molded particles at a temperature from 400° to 600° C.

Although the metal selected from a group of the first transition metals of the periodic table which has been added in the form of an inorganic acid salt or an organic acid salt exists in the form of a metal salt of heteropoly-acid in the catalyst, it is not an essential requirement that all of the metals are in the form of a metal salt of heteropoly-acid. That is to say, the metal not forming the metal salt of heteropoly-acid may be contained in the catalyst in the form of the metal oxide.

The ratios of the metal of the first transition metals to the metals of polyacid radical constituting heteropoly-acid in the catalyst of the present invention are in the range of from 1:40 to 6:1 in the terms of weight. The catalyst thus prepared is different from the metal oxide catalyst which has been usually used as the catalyst for reducing nitrogen oxides with ammonia, namely this catalyst exhibits higher stability to sulfur oxides and also maintains higher activity through a prolonged period of operation.

The process for reducing nitrogen oxides contained in the waste gas to nitrogen which is the second object of the present invention will be explained below:

Generally, the reducing agent such as $H_2$, CO, $H_2S$, $NH_3$, $CH_4$, etc. has been used for the catalitic reduction of nitrogen oxides. The reducing agent is necessary to have a thermodynamic property such that nitrogen oxide is readily reduced to nitrogen at a relatively low temperature, and also properties of not reacting with oxygen alone coexisting in the waste gas and of selectively reacting with nitrogen oxides. Especially, since the waste gas coming from boilers and heating furnaces usually contains 1 to 3% by weight of oxygen, the temperature of the catalyst layer increases due to the reaction of oxygen with the reducing agent, and therefore, it is necessary to provide a device for removing reaction heat from the reaction system which results in the disadvantages of complication of the process plant and the increase of the consumption of the reducing agent. In the present invention, ammonia is used as the reducing agent, taking aforementioned matters into consideration.

The required quantities of ammonia as the reducing agent depend on the contents of nitrogen oxides contained in the waste gas. When the quantity of ammonia is less than the stoichiometric quantity required for the reduction of nitrogen oxides, the conversion of nitrogen oxides is low, on the contrary when the quantity of ammonia is much excessive to the stoichimetric quantity required for the reduction of nitrogen oxides, residual amount of ammonia discharged from the process increases, and a secondary treatment may be required for removing residual ammonia. Taking the various related matters into consideration, the molar ratio of $NH_3/NO_x$ is prefered to fall in the range of from 0.8 to 1.5, especially from 1.0 to 1.2.

This process can be applied for the removal of nitrogen oxides contained in the waste gas from a varied combustion system which usually contains 10 to 1,000 ppm of nitrogen oxides optionally in conjunction with 1,000 to 2,000 ppm sulfur oxides and 1 to 3% by volume of oxygen.

The required reaction temperature is in the range of from 250° to 550° C., especially from 350° to 450° C. When the reaction temperature is less than 250° C., the activity of the catalyst is depressed whereby the desired conversion is hardly obtained, while when the reaction temperature is more than 550° C., the undesirable reaction between ammonia and oxygen coexisting in the reaction system is easily occurred.

In the selection of the reaction temperature, it must be taken into due account that it is closely related to the so-called gaseous hourly space velocity (GHSV) which is the quotient obtained by dividing the volume of inlet gas per hour by the volume of catalyst. For the purpose of the present invention, there is generally adopted GHSV in the range of from 1,000 to 50,000 $HR^{-1}$ in the range of the reaction temperature of the present invention.

In the practice of the present invention, there can be used any ordinary fixed-bed type reactor. In addition, there can be used the so-called honey-comb type reactor or any other varied type of reactor designed to minimize the pressure drop.

The present invention has the following advantages in comparison to the ordinary process.

(1) A new catalyst, one of the characteristic feature of the present invention, which is different from the prior metal oxide catalyst, enables the operation to be continued effectively over a prolonged period in a reaction system in which sulfur oxide is present, because the catalyst of the present invention is not deteriorated in activity due to the poisonous effect of sulfur oxide.

(2) According to the present invention, it does not entail a wastefull use of the reducing agent, because the reducing agent in the presence of the catalyst does not selectively reacts with oxygen coexisting in the gas which should be treated. Also, the range of reaction temperature in which the nitrogen oxides are reduced at a high conversion rate is so wide that the reaction system does not require rigid temperature control but provides stable operation.

(3) Since the catalyst is resistant to sulfur oxides, the process of this invention has an advantage that it can be incorporated in any waste gas treatment system either before or after the desulphurization process. For example, if the process of this invention is connected after the desulphurization process, the conversion of nitrogen oxide is not affected by the variation of the removal rate of sulfur oxide since the catalyst of this invention is resistant to the poison of sulfur oxide, while the process of this invention can be placed before the desulphurization process although it is considerable that it is difficult to place it before the desulphurization process.

Various embodiments of the present invention are described in the following Examples:

EXAMPLE 1

Various catalysts were prepared according to the following procedures.

(1) Catalyst A was prepared by impregnating γ-Al$_2$O$_3$ carrier with aqueous solution of silicotungstic acid and iron nitrate, drying at 100° to 110° C. and thereafter calcining at 550° C. for 3 hours in a stream of air. The amount of metals supported on the carrier was 3% by weight of iron and 10% by weight of tungsten based on the weight of carrier.

(2) Catalyst B was prepared by impregnating γ-Al$_2$O$_3$ carrier with aqueous solution of silicotungstic acid and copper nitrate, drying at 100° to 110° C. and thereafter calcining at 550° C. for 3 hours in a stream of air. The amount of metals supported on the carrier was 3% by weight of copper and 10% by weight of tungsten based on the weight of carrier.

(3) Catalyst C was prepared by impregnating γ-Al$_2$O$_3$ with aqueous solution of silicotungstic acid and chromium nitrate, drying at 100° to 110° C. and subsequently calcining at 550° C. for 3 hours in a stream of air. The amount of metals supported on the carrier was 3% by weight of copper and 10% by weight of tungsten based on the weight of carrier.

(4) Catalyst D was prepared by impregnating γ-Al$_2$O$_3$ with aqueous solution of phosphomolybdate and iron nitrate, drying at 100° to 110° C. and subsequently calcining at 550° C. for 3 hours in a stream of air. The amount of metals supported on the carrier was 3% by weight of iron and 10% by weight of molybdenum.

(5) Catalyst E was prepared by impregnating γ-Al$_2$O$_3$ with aqueous solution of phosphotungstic acid and iron nitrate, drying at 100° to 110° C. and then calcining at 550° C. for 3 hours in a stream of air. The amount of metals supported on the carrier was 3% by weight of iron and 20% by weight of tungsten on the basis of carrier.

(6) Catalyst F was prepared by impregnating γ-Al$_2$O$_3$ with aqueous solution of silicotungstic acid, copper nitrate and iron nitrate, drying at 100° to 110° C. and then calcining at 550° C. for 3 hours in a stream of air. The amount of metals supported on the carrier was 2% by weight of iron and 2% by weight of copper and 10% by weight of tungsten on the basis of carrier.

(7) Catalyst G was prepared by impregnating γ-Al$_2$O$_3$ with aqueous solution of silicotungstic acid, iron nitrate and chromium nitrate, drying at 100° to 110° C. and then calcining at 550° C. for 3 hours in a stream of air. The amount of metals supported on the carrier was 2% by weight of iron and 2% by weight of chromium and 10% by weight of tungsten on the basis of carrier.

(8) Catalyst H was prepared by impregnating SiO$_2$·Al$_2$O$_3$ with solution of silicotungstic acid and iron nitrate and thereafter drying at 100° to 110° C. and calcining at 550° C. for 3 hours in a stream of air. The amount of metals supported on the carrier was 3% by weight of iron and 10% by weight of tungsten on the basis of carrier.

(9) Catalyst I was prepared by impregnating SiO$_2$·Al$_2$O$_3$ with aqueous solution of phosphotungstic acid and iron nitrate, drying at 100° to 110° C. and then calcining at 550° C. for 3 hours in a stream of air. The amount of metals was 3% by weight of iron and 20% by weight of tungsten on the basis of carrier.

(10) Catalyst J was prepared by impregnating SiO$_2$ with aqueous solution of silicotungstic acid and copper nitrate, drying at 100° to 110° C. and then calcining at 550° C. for 3 hours in a stream of air. The amount of metal was 3% by weight of copper and 10% by weight of tungsten on the basis of carrier.

(11) Catalyst K was prepared by impregnating SiO$_2$·Al$_2$O$_3$ with aqueous solution of silicotungstic acid and ferricammonium oxalate, drying at 100° to 110° C. and then calcining at 550° C. for 3 hours in a stream of air. The amount of metals supported on the carrier was 6% by weight of iron and 6% by weight of tungsten on the basis of carrier.

(12) Catalyst L was prepared by adding SiO$_2$·Al$_2$O$_3$ powder and copper acetate into the aqueous solution of silicotungstic acid, mixing the same, evaporating a major portion of water, kneading a mixture of carrier powders, subjecting the kneaded mixture to extrusion to form into the cylindrical form of 1.3×3 mm and then after drying, calcining the extruded particles at 550° C. for 3 hours. The amount of metal supported on the carrier was 6% by weight of copper and 10% by weight of tungsten on the basis of carrier.

The catalysts thus obtained were tested for initial activity. The reactor measured 20 mm in diameter and 500 mm in length in which a preheating zone and a catalytic zone are provided were maintained at the desired temperature by means of electric heaters. The reactor was packed with 10 cc of the catalysts A to L, respectively.

A simulated waste gas consisting of 500 ppm of NO, 550 ppm of NH$_3$, 1500 ppm of SO$_2$, 3% of O$_2$, 10% of steam and the balance of N$_2$ was introduced into the reactor at a rate of 260 Nl/HR. The NO concentration of the outlet gas discharged from the reactor at a temperature of from 250° to 450° C. was analyzed to calculate NO conversion. Fine results were shown in Table 1.

Comparative Example 1

Catalyst M was prepared by impregnating γ-Al$_2$O$_3$ carrier with aqueous solution of iron nitrate, drying at 100° to 110° C. and thereafter calcining at 550° C. for 3 hours in a stream of air. The amount of metal supported on the carrier was 6% by weight of iron on the basis of carrier. The catalyst was tested for initial activity under the conditions same as those in Example 1. The results are indicated in Table 1 in conjunction with those of Example 1.

Table 1.

| | Catalyst | Reaction temperature (°C.) | | | | |
|---|---|---|---|---|---|---|
| | | 250° C. | 300° C. | 350° C. | 400° C. | 450° C. |
| | A | 54.8 | 70.0 | 84.5 | 96.5 | 99.0 |
| | B | 50.5 | 65.5 | 84.0 | 96.0 | 98.5 |
| | C | 45.0 | 60.3 | 62.0 | 85.5 | 95.0 |
| | D | 48.5 | 62.5 | 75.0 | 90.0 | 95.5 |
| | E | 56.0 | 72.5 | 85.5 | 97.0 | 99.5 |
| NO | F | 50.0 | 70.5 | 84.5 | 94.5 | 98.5 |
| Conversion | G | 52.5 | 73.5 | 86.0 | 95.5 | 99.0 |
| (%) | H | 56.8 | 72.5 | 86.5 | 97.3 | 99.9 |
| | I | 55.5 | 73.5 | 87.5 | 96.3 | 99.5 |
| | J | 43.5 | 58.5 | 73.5 | 88.8 | 98.1 |
| | K | 53.2 | 68.5 | 85.5 | 96.9 | 99.2 |
| | L | 39.5 | 55.0 | 71.5 | 82.0 | 95.4 |
| | M | 28.5 | 50.5 | 73.5 | 85.5 | 92.0 |

EXAMPLE 2

Catalysts A, F and M prepared in Example 1 and Comparative Example 1 were subjected to life test by using a simulated waste gas. The composition of the simulated gas and gaseous hourly space velocity were same as those of Example 1. The reaction temperature was kept at 400° C. The results are shown in Table 2. It was observed that the activity of the catalysts of this invention was maintained for a long period of time and the activity of the ordinary catalyst was decreased rapidly. This proves that the catalyst of the present invention satisfactorily qualifies as a catalyst suitable for the commercial operation.

Table 2.

| Reaction Time (HR) | | 5 | 100 | 500 | 1000 | 1500 | 2000 |
|---|---|---|---|---|---|---|---|
| No | Catalyst A | 96.0 | 95.5 | 95.6 | 95.4 | 95.5 | 95.4 |
| Conversion | Catalyst F | 94.5 | 94.2 | 94.3 | 94.3 | 94.0 | 94.1 |
| (%) | Catalyst M | 82.5 | 82.1 | 81.8 | 83.0 | 59.4 | 48.1 |

What is claimed is:

1. A process for reducing nitrogen oxides contained in waste gas to nitrogen with ammonia as a reducing agent at a temperature of from 250° C. to 450° C. in the presence of a solid catalyst on a support said catalyst being a heteropoly acid compound of a metal from the group consisting of the first transition metals of the periodic table and mixtures thereof, wherein the heteropoly acid is selected from the group consisting of silicotungstic acid, silicomolybdic acid, phosphotungstic acid and phosphomolybdic acid.

2. A process according to claim 1 wherein the GHSV is in the range of from 1,000 to 50,000 $HR^{-1}$ at a temperature in the range of from 250° to 450° C.

3. A process according to claim 1 wherein the molar ratio of $NH_3/NO_x$ is in the range of from 0.8 to 1.5.

4. A process according to claim 3 wherein the molar ratio of $NH_3/NO_x$ is in the range of from 1.0 to 1.2.

5. A process according to claim 1 wherein the waste gas to be treated contains 10 to 1,000 ppm nitrogen oxides optionally in conjunction with 1,000 to 2,000 ppm sulfur oxides and 1 to 3% by volume of oxygen.

6. A process according to claim 5 wherein the waste gas to be treated is those coming from boilers, heating furnaces and incinerators.

7. A process according to claim 1 wherein the metal of a group of the first transition metals of the periodic table is selected from the group consisting of copper, titanium, vanadium, chromium, manganese, iron, cobalt and nickel.

8. A process according to claim 1, wherein the heteropoly acid compound of the metal is iron silicotungstate, copper silicotungstage, iron silicomolybdate, copper silicomolybdate, iron phosphotungstate, copper phosphotungstate, iron phosphomolybdate or copper phosphomolybdate.

9. A process according to claim 1 wherein the metal of a group of the first transition metals of the periodic table is selected from copper and iron.

10. A process according to claim 1 wherein the support is a heat-resistant porous support having at least 50 $m^2/g$ of specific surface area and from 0.2 to 1.5 cc/g of pore volume.

11. A process according to claim 10 wherein the heat-resistant porous support is selected from a group consisting of alumina, silica, silica-alumina and diatomaceous earth.

12. A process according to claim 11 wherein silica-alumina contains 60 to 90% by weight of silica.

13. A process according to claim 1 wherein, in the compound, the ratio of metal to polyacid radicals is from 1:40 to 6:1 in terms of metal weight.

14. A process according to claim 1 wherein the amount of the metal compound of heteropolyacid on the support is from 0.5 to 50% by weight based on the total weight.

15. A process according to claim 1 wherein the amount of the metal compound of heteropolyacid on the support is from 1.0 to 30% by weight based on the total weight.

16. A process for reducing nitrogen oxides contained in the waste gas containing optionally sulfur oxides and oxygen to nitrogen with ammonia as a reducing agent in the presence of the catalyst comprising 1 to 30% by weight of one or more metal salts of heteropoly-acid selected from the group consisting of iron silicotungstate, copper silicotungstate, iron silicomolybdate, copper silicomolybdate, iron phosphotungstate, copper phosphotungstate, iron phosphomolybdate and copper phosphomolybdate as the active component based on the catalyst supported on the heat-resistant porous carrier having not less than 50 $m^2/g$ of specific surface area and from 0.2 to 1.5 cc/g of pore volume, at temperature of from 250° to 450° C. in the GHSV of 1,000 to 50,000 $HR^{-1}$, the molar ratio of $NH_3/NO_x$ being in the range of from 1.0 to 1.2.

* * * * *